US008001079B2

(12) United States Patent
Lu et al.

(10) Patent No.: US 8,001,079 B2
(45) Date of Patent: Aug. 16, 2011

(54) SYSTEM AND METHOD FOR SYSTEM STATE REPLICATION

(75) Inventors: Xiaofeng Lu, Indianapolis, IN (US); David J. Demlow, Carmel, IN (US); Rob Beeler, Carmel, IN (US)

(73) Assignee: Double-Take Software Inc., Southborough, MA (US)

( * ) Notice: Subject to any disclaimer, the term of this patent is extended or adjusted under 35 U.S.C. 154(b) by 486 days.

(21) Appl. No.: 12/040,289

(22) Filed: Feb. 29, 2008

(65) Prior Publication Data

US 2009/0222498 A1    Sep. 3, 2009

(51) Int. Cl.
*G06F 17/30* (2006.01)

(52) U.S. Cl. ............... 707/616; 707/634; 714/4; 714/6; 714/15

(58) Field of Classification Search .................. 707/204; 709/246; 714/15
See application file for complete search history.

(56) References Cited

U.S. PATENT DOCUMENTS

| | | | |
|---|---|---|---|
| 5,608,865 A * | 3/1997 | Midgely et al. ............... 714/1 |
| 5,974,563 A * | 10/1999 | Beeler, Jr. .................... 714/5 |
| 6,249,879 B1 * | 6/2001 | Walker et al. ................ 714/11 |
| 6,535,998 B1 * | 3/2003 | Cabrera et al. ............... 714/15 |
| 6,560,719 B1 * | 5/2003 | Pham et al. ................. 714/15 |
| 6,697,960 B1 | 2/2004 | Clark et al. |
| 6,820,136 B1 * | 11/2004 | Pham et al. ................. 709/248 |
| 6,920,580 B1 * | 7/2005 | Cramer et al. ............... 714/4.11 |
| 7,010,717 B2 * | 3/2006 | Whitlow ...................... 714/4 |
| 7,124,320 B1 * | 10/2006 | Wipfel ........................ 714/13 |
| 7,383,463 B2 * | 6/2008 | Hayden et al. .............. 714/4.11 |
| 7,418,439 B2 * | 8/2008 | Wong .......................... 1/1 |
| 7,440,984 B2 * | 10/2008 | Augenstein et al. ......... 1/1 |
| 7,489,782 B1 * | 2/2009 | DeVos ........................ 380/278 |
| 7,617,217 B1 * | 11/2009 | Chen et al. .................. 1/1 |
| 7,680,957 B1 * | 3/2010 | Ketterhagen et al. ....... 709/246 |
| 7,739,240 B2 * | 6/2010 | Saito et al. .................. 707/634 |
| 2005/0198327 A1 | 9/2005 | Iwamura et al. |
| 2007/0033356 A1 | 2/2007 | Erlikhman |
| 2007/0143373 A1 | 6/2007 | D'Souza et al. |
| 2007/0180302 A1 * | 8/2007 | Allen et al. ................. 714/6 |

OTHER PUBLICATIONS

International Search Report dated Jun. 3, 2009 received in corresponding Int'l Application No. PCT/US2009/035531.

* cited by examiner

*Primary Examiner* — Debbie Le
(74) *Attorney, Agent, or Firm* — Hogan Lovells US LLP

(57) ABSTRACT

The invention generally describes a system and method for data backup and recovery, in particular for backing up an entire server (i.e., system state and data) in substantially real-time. The invention provides high availability by failing a source server over to a target server if the source server fails, where the target server is reconfigured nearly identically to the source server. The invention does not require the source and target servers to have identical hardware or operating system versions. The invention further allows for rapid, automatic, restoration of a source server.

69 Claims, 16 Drawing Sheets

SYSTEM AND METHOD FOR SYSTEM STATE REPLICATION

BACKGROUND

1. Field of the Invention

The present invention relates generally to the field of data replication and server recovery techniques for computer operating systems, and in particular, to an apparatus and method providing substantially real-time back-up of an entire server including system state information as well as data.

2. Background Art

A network is a collection of computers connected to each other by various mechanisms in order to share programs, data, and peripherals among computer users. Data on such systems are periodically copied to a secondary "backup" media, for numerous reasons; including computer failure or power shortage that may damage or destroy some or all of the data stored on the system.

A standard approach to backing up data is to perform "full backups" of files on the system on a periodic basis. This means copying the data stored on a given computer to a backup storage device. A backup storage device usually, but not always, supports removable high-capacity media (such as Digital Audio Tape or Streaming Tape). Between full backups, incremental backups are performed by copying only the files that have changed since the last backup (full or incremental) to a backup storage device. This reduces the amount of backup storage space required as files that have not changed will not be copied on each incremental backup. Incremental backups also provide an up-to-date backup of the files, when used in conjunction with the full backup.

One problem with this technique is that the data stored to the backup media is only valid at the exact time the backup is performed. Any changes made after one incremental backup, but before the next, would be lost if there were a failure on the file storage media associated with the computer. Moreover, since the backup process on a large system can take several hours or days to complete, files backed up to the beginning of a tape may have been modified by the time the backup completes.

Another disadvantage of this approach is that with most systems, all files to be copied to backup storage media must be closed before a backup can be performed, which means that all network users must log off the system during the backup process. If files remain open during the backup process, the integrity of the backup data is jeopardized. On a network with hundreds or thousands of users, this can be a time-consuming process. In organizations that require full-time operation of a computer network, this approach is not likely feasible.

To address the problem of backing up open files, techniques have been developed to ensure that no changes are made to a file while it is being backed up. While a file is being copied to backup storage media, the original contents of the data to be overwritten are stored in a "pre-image cache", which is a disk file allocated specifically for this product. Reads from a backup program are redirected to the pre-image cache if the requested data has been overwritten. Otherwise, the backup read is directed to the original file on disk. Related files on a disk can be "grouped", so that changes to all files in the group are cached using the technique described above, whenever any one file in the group is being backed up. One problem with this approach is that the resulting backup is still only valid until a change is made to any one of the files on the system.

More recently, several approaches have been developed to backup the data on a computer system in real-time, meaning the data is backed up whenever it is changed. In such known methods, a full backup of the primary storage media is made to a backup media, then incremental backups of changed data is made whenever a change is made to the primary storage media. Since changes are written immediately to the backup media, the backup media always has an updated copy of the data on the primary media. A second hard disk (or other non-volatile storage media) that is comparable in size and configuration is required for this method.

One such approach is to perform "disk mirroring." In this approach, a full backup of a disk is made to a second disk attached to the same central processing unit. Whenever changes are made to the first disk, they are mirrored on the second disk. This approach provides a "hot-backup" of the first disk, meaning that if a failure occurs on the first disk, processing can be switched to the second with little or no interruption of service. A disadvantage of this approach is that a separate hard disk is required for each disk to be backed up, doubling the disk requirements for a system. The secondary disk must be at least as large as the primary disk, and the disks must be configured with identical volume mapping. Any extra space on the secondary disk is unavailable. Also, in many cases errors that render the primary disk inoperable affect the mirrored disk as well.

Some existing systems have the capability to mirror transactions across a network. All disk I/O and memory operations are forwarded from a file server to a target server, where they are performed in parallel on each server. This includes reads as well as writes. If a failure occurs on the source server, operation can be shifted to the target server. Both the source and target servers must be running the same software in this backup configuration, and a proprietary high-speed link is recommended to connect the two servers. A disadvantage of this approach is that since all operations are mirrored to both servers, errors on the primary server are often mirrored to the secondary server. Local storage on both the source and target servers must be similarly configured.

This network mirroring capability can be used to provide a mechanism to quickly switch from the source server to the target server in the event of a failure. Communication between the source and target servers is typically accomplished via a dedicated, proprietary interface. While the source and target server do not have to be identical, identical partitions are required on the local file system of each server.

Most disaster recovery procedures require that a periodic backup of the system be stored "off-site", at a location other than where the network is being operated. This protects the backup data in the event of a fire or other natural disaster at the primary operating location, in which all data and computing facilities are destroyed. Baseline and incremental techniques can be used to perform such a backup to removable media, as described above. A disadvantage of the "mirroring" approaches to real-time backup is that the target server or disk cannot be backed up reliably while mirroring is being performed. If a file is open on the target server or disk, as a result of a mirroring operation, it can not be backed up to a separate backup storage device. The result of this limitation is that all users have to be logged off of the system before such a backup can take place.

Standard file replication techniques are unable to back up system state information, because the system state is normally stored in locked, open files, which prevents mirroring. Thus, one approach is to use operating system specific mechanisms to monitor specific systems files and functions. For example, the Windows® API may be used to monitor changes to the registry and replicate those changes to a backup server. The APIs that Microsoft provides for this type of monitoring in Windows® simply notify a program that a key has changed. It is then necessary to either (a) replicate all of the values and subkeys under that key or (b) maintain a separate copy of all the keys, subkeys and values and determine what specifically has changed. Thus, this approach results in additional processing that could significantly burden the CPU, or sending unnecessary data. It also fails to capture additional system state changes outside of the registry.

These foregoing approaches introduce some degree of fault-tolerance to the computer system, since a failure on the primary storage media or computer can be tolerated by switching to the secondary storage media or computer. A disadvantage common to all of these techniques is that there is a one-to-one relationship between the primary and secondary storage media, thereby doubling the hardware resources required to implement mirroring. Even if only a small number of data files on a server are considered critical enough to require real-time replication, a separate, equivalent copy of the server or hard disk is still necessary. If critical files exist on several computers throughout the network, mirroring mechanisms must be maintained at each computer. None of these approaches provides a method for mirroring between multiple computers. Further, none of these approaches allows for saving the entire state of a computer, including both configuration information and data. As a result, if a server failure requires that the server be rebuilt (i.e., reconfigured from a bare installation), that rebuild must still be done manually. Even if some configurations are stored and can be pushed onto a bare server, additional manual configuration will nearly always be required in order to restore the server to its previous state prior to failure. Furthermore, current approaches do not account for situations where different hardware is present on the server to which the failover is being directed.

Thus, there remains a need in the art for improvements in real-time back-up of a server.

SUMMARY OF THE INVENTION

The invention generally describes a system and method for backing up an entire server (i.e., system state and data) in substantially real-time. The invention also provides high availability by failing over to a target server if a source server fails, where the target server is configured based upon the configuration of the source server. The invention further allows for rapid, automatic, restoration of a source server, and may be used to migrate existing server workload to new hardware.

In a client-server environment, client computers communicate across a network to a more powerful and more specialized server computer. This model allows the aggregation of data and computing power on a centrally accessible computer, thus providing greater functionality to remote client computers at a significantly lower cost. A disadvantage of the client-server environment is that the server is a single point of failure. If the server computer fails, clients no longer have access to the data or functions provided by the server computer until the server computer is brought back online. This downtime can be greatly reduced by providing a backup server computer ("target") that takes over if the primary server computer ("source") fails. In order to provide transparent "failover" from the source to the target without losing data, the target must have certain data that is identical to the source at the time of failure. Further, if a failure on the source server is severe, the operating system installation may be lost or corrupted, requiring at least some manual rebuilding of the source server. Replicating the system state of the source server also allows automatic rebuilding of the source server to its original configuration, reducing the total time to recovery.

The present invention uses the file backup system and method described in commonly assigned U.S. Pat. Nos. 5,974,563 and 5,819,020, the specifications of which are hereby incorporated by reference in their entirety, or a substantially similar system to replicate files between the source server and the target server in near real-time. The system described in those patents operates at the I/O level of the operating system, sending to the target server only the file changes that are made on the source server. This approach means that files do not have to be opened (and thus locked) in order to replicate changes. The backup system replicates file and system state in an asynchronous manner, meaning the replication process does not impose significant delays in the changes being applied on the source system. Further, the backup system maintains inter- and intra-file consistency between source and target systems, meaning writes are applied in the same order on the source and target. It also allows operation in both LAN and WAN environments, and supports low/poor bandwidth environments with queuing of changed data when bandwidth is not available to transmit changes at once.

If the source server fails over to the target server, any changes made to the target system must be resynchronized back to the source server. The backup system provides a mechanism to resynchronize a source and target system (both file and system state data) without transmitting the entire contents of the server. Only individual blocks of data that have changed are transmitted during the process.

The backup system and method of the invention further provides the ability to limit the bandwidth used between the source and target servers when transmitting file and system state data in order to reduce network traffic during heavy usage periods. The backup system also provides the ability to compress file and system state data that is being transmitted between the source and target servers, and identify and resolve orphaned data files on target servers.

The present invention further includes a system for backing up the source server system state. The purpose of backing up the system state in addition to data is to allow failover to a target server that is configured relative to the configuration of the source server, and, preferably, as nearly identical to the configuration of the source server as possible without compromising stability or operation of the target server. The system state of a server includes all of the configuration information for the server, such as user accounts, device drivers, boot profiles, and other system settings. For example, a Microsoft Windows® server (e.g., Microsoft Exchange Server 2003®) stores system state information in a specialized data structure called the registry and in specialized system files. The registry is a hierarchical database for storing configuration information. This database is actually stored on the disk of the server in a number of files that are typically locked while the server is running. In addition, there are specialized system files used by the operating system to store configuration information, including device drivers, system executables, and other system files required at boot. Because the backup system captures all file I/O, file changes to the registry and system files are captured, even though the files are ordinarily locked. The present invention replicates the registry and system files from the source server in near real-time onto the target server.

The present invention further provides a staging area on the target server for storing replicated versions of files that are locked or open on the target server, or otherwise cannot be modified on the target server without causing an error, such as system state files. Preferably, the staging area on the target utilizes a blocking technology that prevents accidental or malicious erasure or modification of the source's system state data files. During failover, these files are moved to the correct locations so that when the recovering server is rebooted, the replicated configuration files will be used.

The invention also provides a mechanism to intelligently "merge" registry keys and other system state components from the source and target machines during failover to the target server, so the result is a solution that will work across disparate systems. All hardware device configurations, including the location of the drivers and when they are loaded, along with any software drivers that support that hardware device, are retained from the target server. All other settings are copied from the source server or are intelligently merged based on the source/target configurations.

The invention further provides failover to a target server in the event of a source server failure. As discussed above, the configuration of the target server will be set to be identical to that of the source server during failover by copying system files from the staging area and merging the source registry with the target registry. The target server reboots following the processing of the system files and registry. Once the target server has rebooted, it has the same data as the source server, and has a hybrid configuration (based upon the original target configuration and the source configuration) needed to run the source software on the target hardware.

The invention also provides a mechanism to restore the source server to its saved system state in addition to resynchronizing any data that has since been modified on the target server during recovery. This feature allows for automatic rebuilding of the source server.

The present invention also enables failover between different operating system versions and hardware configurations on the source and target servers. The intelligent registry merge only merges those registry keys that are consistent with the operating system and hardware on the target server, which intelligent merge ensures that device drivers on the target are running with the most aggressive start value available from either the target our source. Thus, for example, if a different video driver is used on the source and target servers, the settings for the target server with respect to the video driver would remain unchanged. The intelligent merge also recognizes the difference between an application service and a device driver such that, in the case of an application service, the source server settings are utilized.

The invention also provides the ability to failover to one of a selected group of available servers. Before attempting a failover to such a server, a process is run to validate that the specified target can accommodate the system state of the source. This is done by comparing various attributes of each server to see if any conflicts occur.

The present invention further supports failover between physical and virtual servers. It is increasingly common to conserve hardware resources by running virtual servers. For example, VMWare® provides a plurality of complete virtual machines from the operating system level up to the application level using a single physical server computer. Other mechanisms for establishing virtual servers include Microsoft Virtual Server® and Xen®. In this regard, the embodiments of the invention can allow a virtual server to act as either a source or target server.

The present invention also supports recovery of domain controllers and recovery to target domain controllers, as well as nodes of a cluster.

The present invention also provides monitoring of the source server, with automatic or manual failover of the target server in the event that the source server is unavailable.

The invention further provides the ability to "reverse" the roles of the source and target server by protecting the system state of each to the other server. A "rescue" of the identity of the target server is enabled in embodiments of the invention by maintaining a copy of the target's system state on the source server. In the case of a role reversal, the state from the original target is applied to the original source, so that the original source becomes the new target and the original target becomes the new source. In the case of a rescue, the target's state information is pulled back from the source and applied, to bring the target back to its original state. Alternatively, the target state may be stored on the target itself as opposed to sending it to the source (or both).

Particular embodiments of the invention provide a stand-alone client interface to allow the setup, management and monitoring of system state protection from local or remote locations. This stand-alone client interface may allow a user, for example, to trigger a manual failover, rescues, role reversals, and migrations between a source and a target.

The invention further provides the ability to change attributes of the source server's identity when applying it to the target server, such as the server name, IP addresses, GUIDs, etc. This allows the invention to be used for server provisioning (using one server image to build hundreds of servers with similar attributes but different identities) and migration. Optionally, the user may be provided with the option to decide whether network information is automatically applied from the source to the target, or if the target retains it's original network settings. This approach can be useful, for example, in cases where DHCP is used (i.e. the servers are assigned IP addresses dynamically from a central server).

The invention also provides a method for backing up a first server, comprising the steps of replicating changes to data files and system state files of the first server to a second server; detecting a failure of the first server; and, upon detection of the failure of the first server, failing over the first server to the second server by merging the replicated system state files of the first server into a system state of the second server.

BRIEF DESCRIPTION OF THE DRAWINGS

The accompanying drawings are included to provide further understanding of the invention and are incorporated in and constitute a part of this specification. The accompanying drawings illustrate exemplary embodiments of the invention and together with the description serve to explain the principles of the invention. In the figures.

DETAILED DESCRIPTION OF PREFERRED EMBODIMENTS

Figure 1:
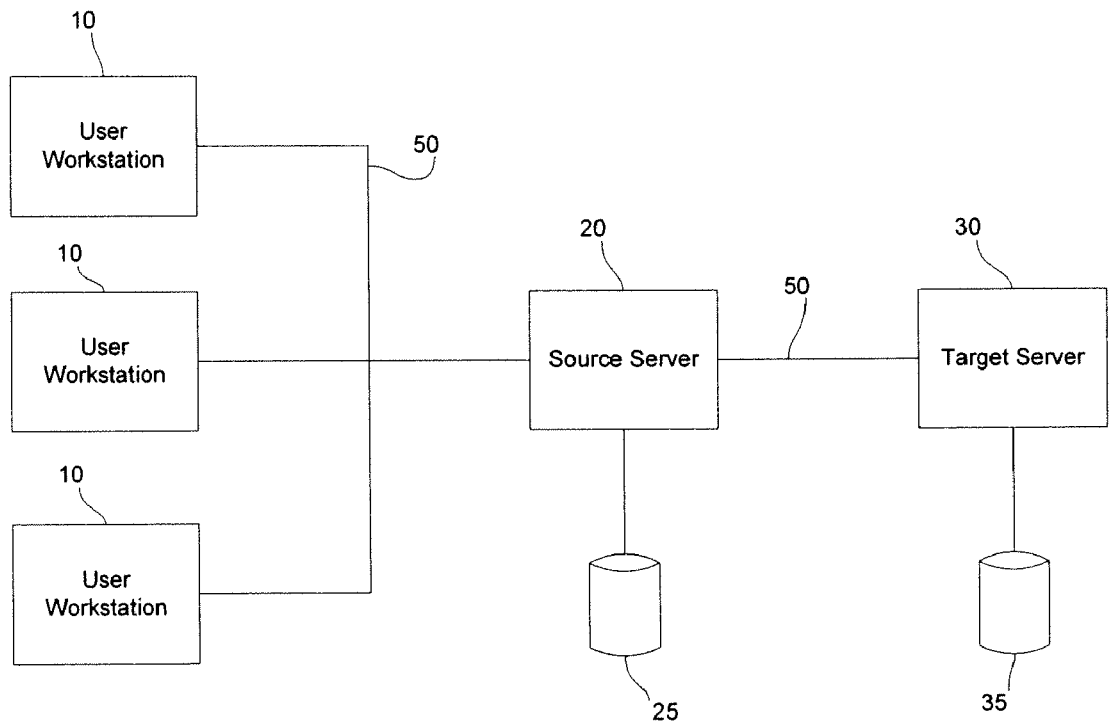
FIG. 1 illustrates an overview of a client-server system with a source and target server.

Illustrated in FIG. 1 is a client-server computer system with client computers 10 connected across a network 50 to a source server 20. The source server 20 has local disk storage 25. The source server 20 and the client computers 10 are further connected across network 50 to a target server 30. The target server 30 has local disk storage 35. The source server 20 may host one or more network applications, such as Microsoft Exchange® or SQL Server 2000®. Application data is stored on local disk storage 25. Client computers 10 access applications on the source server according to a standard client-server model. Application data may change due to a request from a client computer 10 or some other outside event. For example, if the source server 20 is running Microsoft Exchange®, an e-mail message might arrive over simple mail transfer protocol (SMTP). Data files are the files used by applications, such as databases and application executables, while system state files are used by the operating system to store configuration information for the server. The target server 30 maintains a backup of the source server 20, including both data and system state. The target server 30 uses local disk storage 35 (or, equivalently, an attached storage such as SAN) to store its own applications in addition to copies of the data and system state from source server 20. In some embodiments, the source server 20 also stores a copy of the system state of the target server 30. The network 50 may be any form of network, including a LAN, WAN, or the Internet. The source server 20 and target server 30 may use different underlying hardware and different operating system versions. Similarly, local disk storage 25 and local disk storage 35 may not have the same capacity or have identical directory structures.

It is not necessary in embodiments of the present invention for the local disk storage 25 and local disk storage 35 to be of the same file system type. However, as will be readily appreciated by one skilled in the art, if the local disk storages are of not of the same file system type then some metadata may be lost. For example, if one is replicating from NTFS to FAT/FAT32, any file security information that is associated with the source files will not be stored on the target. In this regard, it may be preferable in many instances to utilize disk storage of a common file system type.

In operation, a client computer 10 or another outside event requests an operation on an application running on the source server 20 that would result in a change to a file stored on local disk storage 25. That file change is made to the file version on local disk storage 25 and is also sent to the target server 30 in real time. The target server 30 receives the file change and applies it to the corresponding copy of the file stored on local disk storage 35. Changes to both data and system state files are sent to the target server 30 asynchronously so that, at any point in time, local disk storage 35 contains exact copies of the data and system state files on local disk storage 25.

Because the system state of the source server 20 is replicated in addition to data, this allows failover to a target server 30 that is configured similarly to, and preferably as nearly identically as possible to, the source server 20. Failover is explained in more detail below. The system state of a server includes all of the configuration information for the server, such as user accounts, device drivers, boot profiles, and other system settings. A Microsoft Windows® server (e.g., Microsoft Server 2003®) stores system state information in a specialized data structure called the registry and in specialized system files. The registry is a hierarchical database for storing configuration information.

Figure 2:
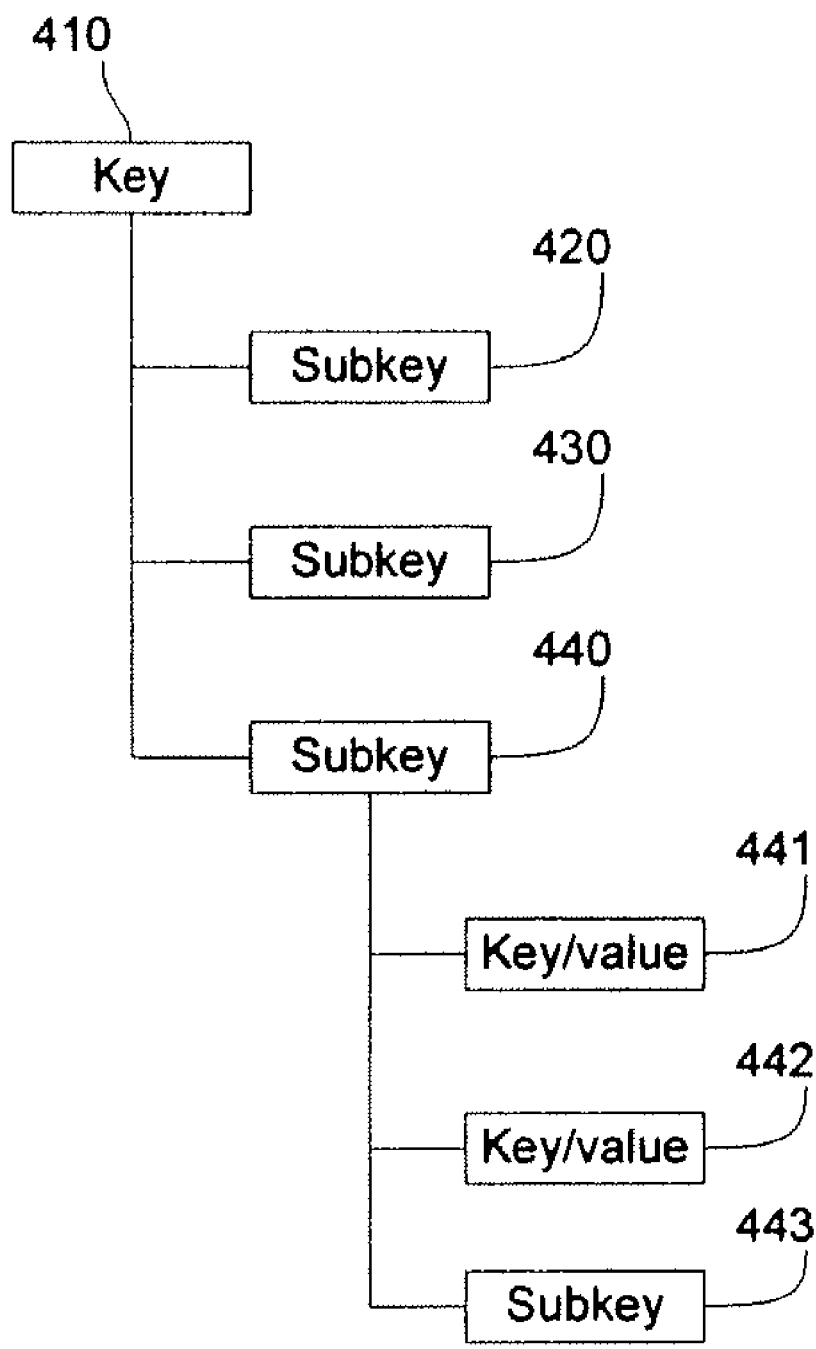
FIG. 2 illustrates the relationship between keys and subkeys in a registry.

The registry stores values using keys. By definition, a key may either store a value or at least one subkey. A value has a type, such string or binary sequence. FIG. 2 illustrates the hierarchical relationship between registry keys. FIG. 2 shows an example of a top-level key 410 with three subkeys 420, 430, and 440. The example in FIG. 2 also illustrates that subkey 440 has three subkeys, which are key/value pairs 441 and 442, and subkey 443. Subkey 443, in turn, may have its own subkeys (although not depicted in the example provided by FIG. 2). Keys are identified by name. For example, Windows® uses three top-level keys: HKEY_USERS, HKEY_LOCAL_MACHINE, and HKEY_CURRENT_CONFIG. All other keys in the registry are hierarchically below one of these three top-level keys. A subkey is referred to by its "path", meaning the path of its parent key, a "\", followed by the name of the subkey. This uniquely identifies any key in the registry. For example, configuration data for most software packages is stored in the key HKEY_LOCAL_MACHINE\Software, which contains a large number of subkeys. For a further example, the key that tells Windows® that program files are stored in the "C:\Program Files" directory is HKEY_LOCAL_MACHINE\Software\Microsoft\Windows\CurrentVersion\ProgramFileDir.

A registry hive is a group of keys, subkeys, and values in the registry that has a set of supporting files containing backups of its data. Thus, the registry is actually stored on the disk of the server in a number of files that are typically locked while the server is running. The supporting files for all hives except HKEY_CURRENT_USER are in the Systemroot\System32\Config folder on Windows NT 4.0®, Windows 2000®, Windows XP®, and Windows Server 2003®; the supporting files for HKEY_CURRENT_USER are in the Systemroot\Profiles\Username folder. ("Systemroot" refers to the root directory of system files directory; for example, this directory is normally C:\Windows on Windows XP®®.) The file name extensions of the files in these folders, and, sometimes, a lack of an extension, indicate the type of data they contain. For example, the registry hive for HKEY_LOCAL_MACHINE\Software is stored in the files Software, Software.log, and Software.sav in the C:\Windows\System32\Config folder on a typical Windows XP® installation. More information regarding the registry structure of Microsoft operating system products and other operating systems is commonly available. See, e.g., http://support.microsoft.com/kb/256986/en-us.

In addition to the registry, there are specialized system files used by the operating system to store configuration information, including device drivers, system executables, and other system files required at boot. It should be understood that the list of particular system files is dependent on the operating system and its version. System files can include boot and OS detection files, registry files, system files, components, and User accounts/profiles. The system state includes the registry plus all of these specialized system files.

Figure 3:
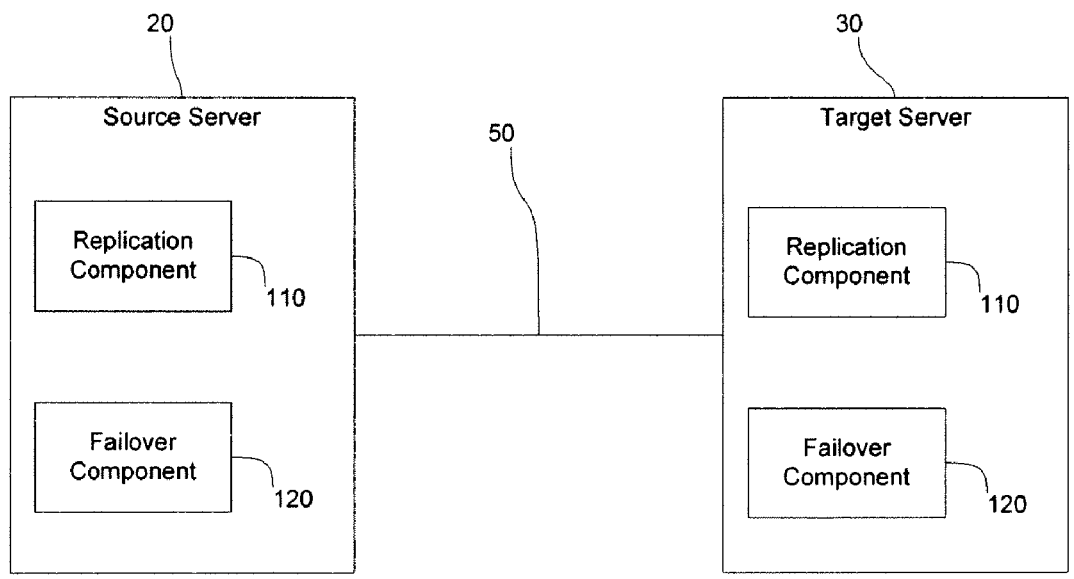
FIG. 3 illustrates an overview of the source and target servers.

As illustrated in FIG. 3, both the source server 20 and the target server 30 execute replication component 110 and failover component 120. Replication component 110 contains the programming logic to intercept file change requests at the I/O level and mirror those file change requests to a designated server asynchronously. The implementation of this functionality is explained in more detail in U.S. Pat. Nos. 5,974,563 and 5,819,020. Failover component 120 contains programming logic to execute a failover or a recovery of the server. For example, if source server 20 fails, the failover component 120 running on target server 30 causes the source server 20 to fail over to target server 30.

When source server 20 comes back up, several different actions can be taken. For example, a role reversal scenario can be initiated following a failover. In this scenario, no resynchronization is needed between the source and target when the source server 20 is brought back online. The source server 20 at this time has the target's identity, and can be configured to apply it when brought online, such that roles of the servers 20 and 30 are reversed. In this regard, failover component 120 causes source server 20 to "become" the new target server, as discussed below.

Another type of action that can be taken can be considered a "failback and rescue target" scenario following a failover. In this second scenario, the system is configured such that source server 20 coming back online after failover initiates a resynchronization of the source identity plus any changes (that occurred since failover) back to source server 20. The failover component 120 on source server 20 will then apply this identity, reestablishing itself in the role of the source. The failover component 120 on the target server 30 will rescue its saved target identity, reestablishing itself in the role of the target. This scenario is also discussed in detail below.

In operation, the replication component 110 is configured to replicate a set of specified files. This configuration is typically stored in a configuration file on the server. On the source server 20, that set includes application data files as well as system state files. On the target server 30, that set includes system state files. As changes are made to those files, those changes are sent to the corresponding server in substantially real-time. Because the changes are captured at the I/O level, no additional opening or locking of the files is needed in order to replicate file changes.

Figure 4A:
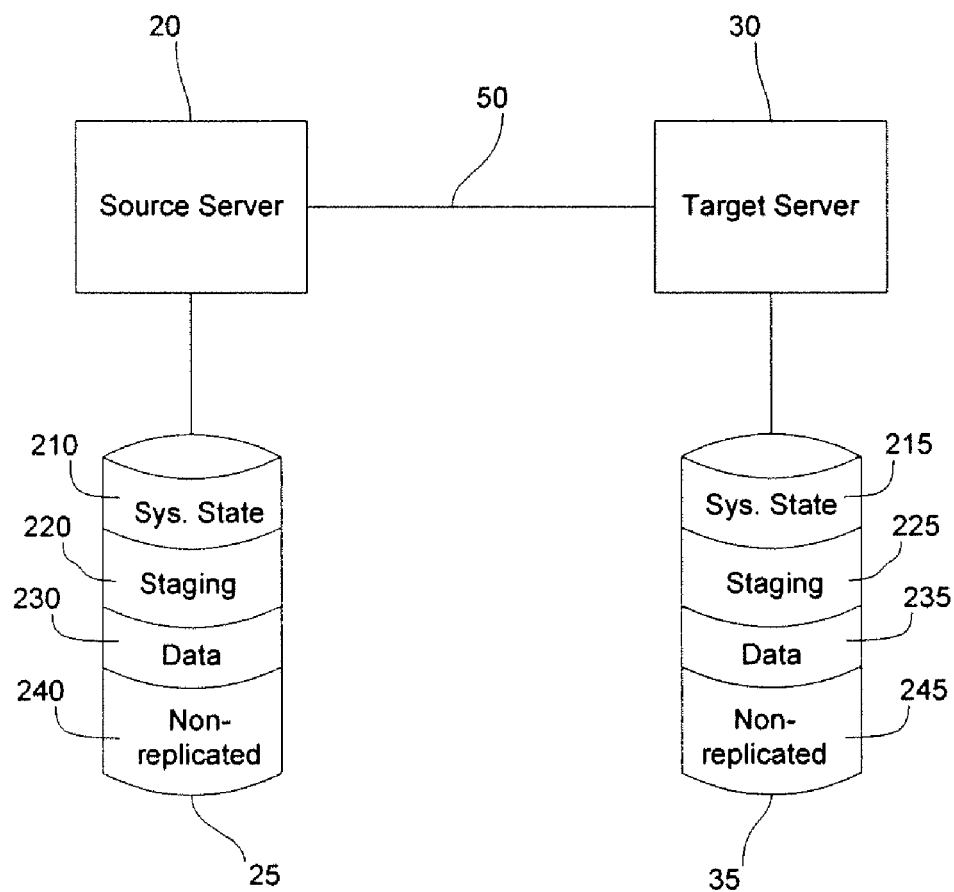
FIGS. 4A, 4B, and 4C illustrate a logical view of disk storage on the server and target servers.

FIG. 4A illustrates a logical view of the file systems on the source server 20 and the target server 30. Local disk storage 25 (and local disk storage 35) can be viewed as having four sets of files: system state files 210 (and 215), staging files 220 (and 225), data files 230 (and 235), and non-replicated files 240 (and 245). System state files 210 and 215 include all of the files in which the system state of the source server 20 and target server 30, respectively, are stored, such as registry files, system executables, and device drivers. It should be understood by one skilled in the art that there are some files that are generally considered to be part of the "system state" but which cannot be copied in a conventional sense to the target depending on the source/target configuration. An example of this relates to hardware abstraction layer ("HAL") files, and, namely, the file hal.dll. In cases where the source and target have different HALs but those HALs are deemed "compatible", the source HAL is not transmitted to the target in embodiments of the invention. Rather, the target HAL is used. For example, if the source server and target server have similar HAL types, though one is for a single processor (CPU) and the other is for multiple processors, the target HAL file is preserved and the source HAL file ignored so that the number of processors on the target server hardware are used. Understandably, the number and specific list of such files that must be treated similarly to HAL files varies depending upon the operating system and version being used.

Staging files 220 and 225 include copies of all of the system state files 215 and 210, respectively, replicated from the target server 30 and source server 20, respectively. Separate staging files 220 and 225 are necessary because system state files 210 and 215, respectively, are normally locked and/or open while the operating system is running. Thus, it would not be possible to copy over the actual configuration files. Data files 230 include the data files used by applications running on the source server 20. Data files 235 are replicated versions of the data files 230, and are stored on local disk storage 35 with the same names and directory structures as data files 230 have on local disk storage 25. Non-replicated files 240 (and 245) are all other files on the source server 20 (and target server 30). Non-replicated files 240 (and 245) are not replicated or mirrored. Such files might include local temporary files, files that an administrator chooses not to replicate for some reason, or files associated with a non-critical application.

One mechanism used in embodiments of the present invention to reduce the problem of locked and open files is to shut down non-critical services on the target server prior to replication. To utilize this mechanism, the target server maintains a list of services that are not "critical," and shuts them down on the target so there are fewer open file conflicts. The operating system may keep track of a list of critical services that it needs to boot, and additional services needed to run the invention are added to the list. Optionally, a user or administrator may be provided with an ability to manually specify further services on the target server that should be left running. An alternative mechanism for addressing locked and open files could entail checking in real time whether a file is open when a replication operations arrive on the target, and then staging files accordingly.

Figure 4B:
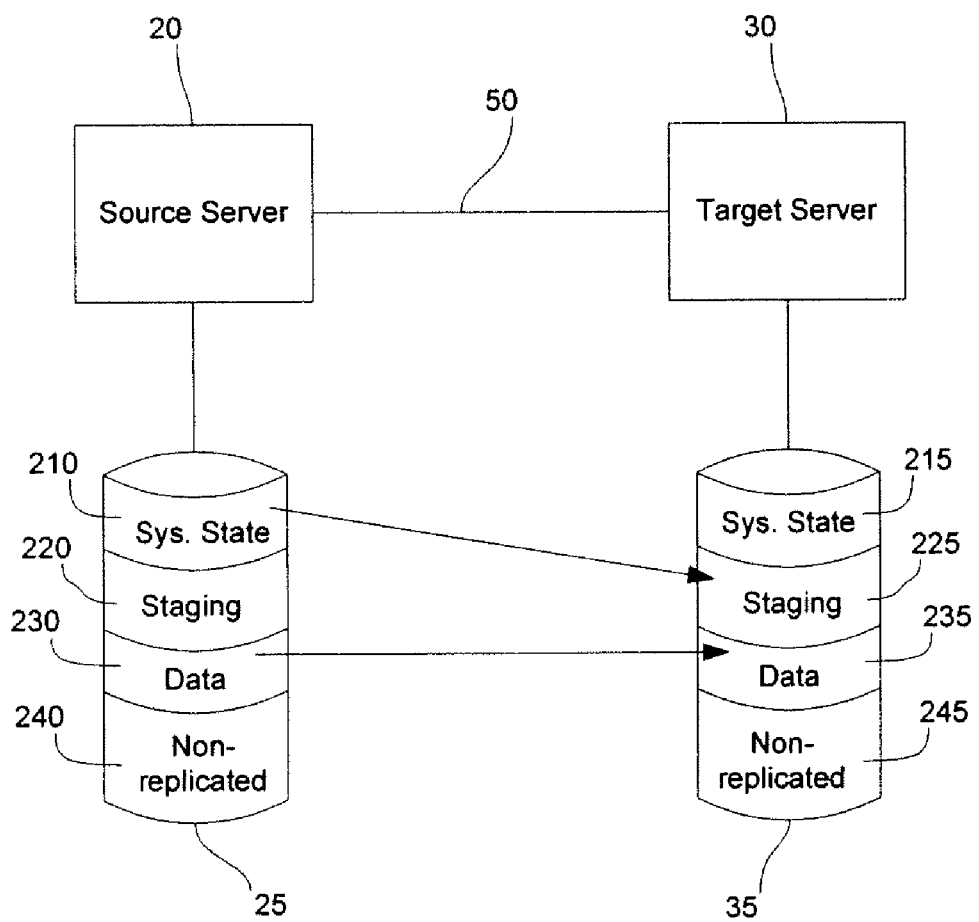

As shown in FIG. 4B, data files 230 on the source server 20 are replicated to corresponding data files 235 on the target server 30. The data files 235 are replicated versions of the data files 230, with changes sent in real time, as explained above. As further shown in FIG. 4B, system state files 210 on the source server 20 are replicated to corresponding staging files 225 on the target server 30. The entire system state of the source server 20 is replicated in order to allow an automated rebuild (discussed below). However, the system state of the source server 20 cannot be copied over the system state of the target server 30 for several reasons. First, the system state files 215 are locked while the operating system is running and cannot be modified without rebooting. Second, the target server 30 may not have the same hardware or operating system version as the source server 20, and so some settings of the target server 30 must be retained even after failover. This latter goal is accomplished through an intelligent merge of system state, discussed below. Third, it is desirable to preserve the target identity until it is time for it to take over the identity of the source because it enables the target machine to continue to be used.

Figure 4C:
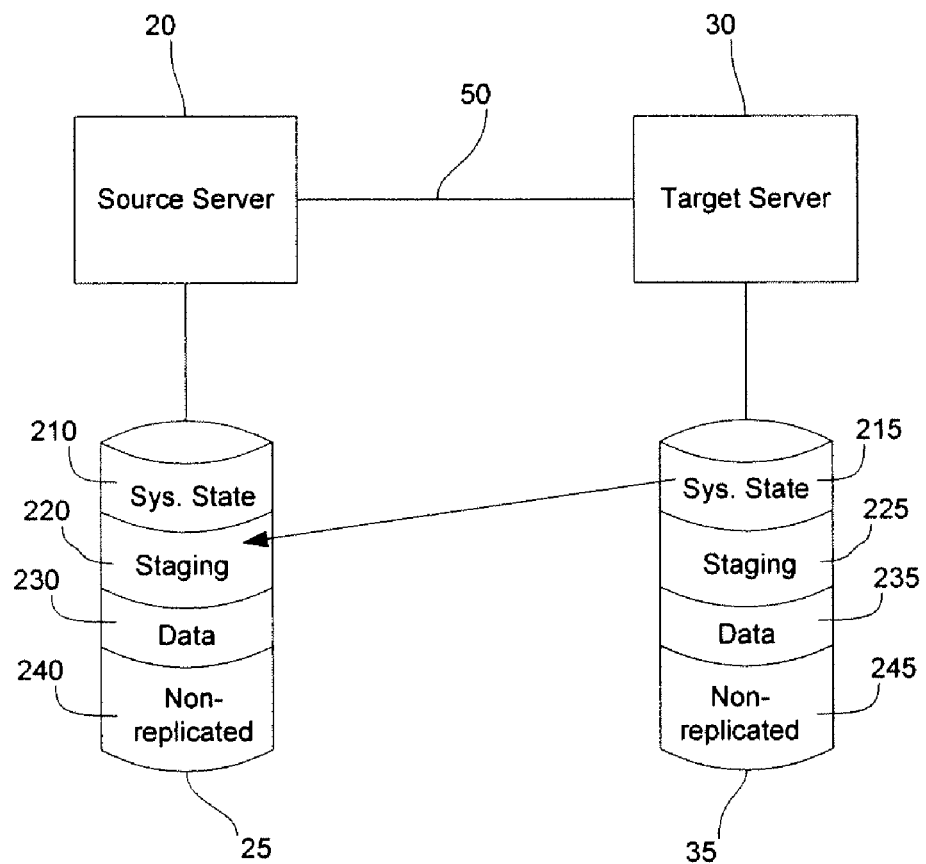

As shown in FIG. 4C, the system state files 215 on the target server 30 are replicated to corresponding staging files 220 on the source server 20. This replication allows two additional functions. First, after the source server 20 has failed over to the target server 30, the source server 20 can in turn thereafter take on the identity of the target server 30 by intelligently merging the saved system state of the target server 30. This role reversal mechanism is discussed in more detail below. Second, if the target server 30 should fail, the saved system state can be used to rebuild the system state of the target server 30 automatically. This rescue mechanism is also discussed below. Optionally, the system state files of the target may additionally be replicated to a storage location on the target to facilitate certain recoveries of the target independent of the source.

Figure 5:
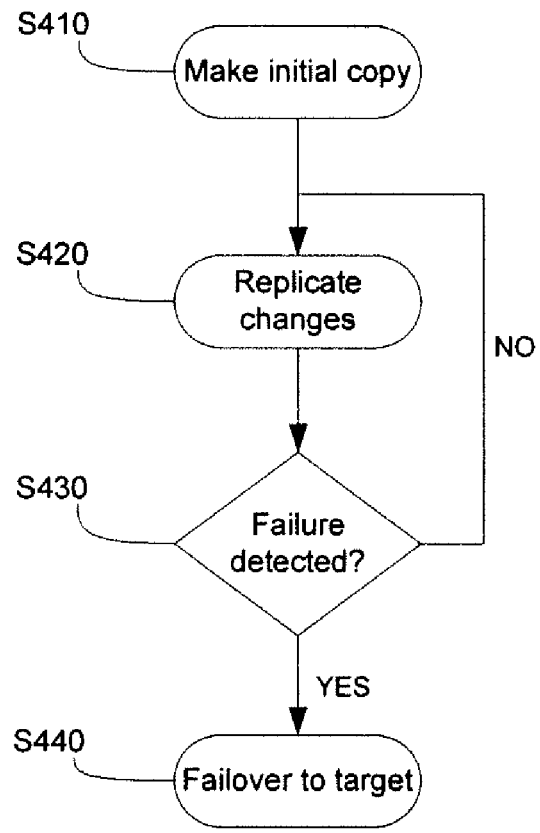
FIG. 5 illustrates a method of providing a backup of the source server with failover.

FIG. 5 illustrates a method of providing a backup of the source server with failover to the target server if the source server should fail. In step S410, data files and system state files are copied from the source server to the target server. This creates a baseline backup on the target server. As explained above, system state files are copied to the staging area. In step S420, changes to data and system state files are replicated asynchronously from the source server to the target server. This is explained in more detail below, in the discussion of FIG. 6. In step S430, the source server is monitored for failure. The monitoring mechanism may include any mechanism for monitoring the state of a server known in the art. For example, the target server can periodically "ping" the source using either an ICMP ping or a command/response test to see if the server is alive. In such cases, the user can be provided with a configurable option to select an interval at which the target pings the source, and/or specify the number of sequential pings that must be missed for the source server to be failed. If this number of pings are missed, the source is considered "failed", and failover processing would then be initiated.

If the source server has not failed, step S420 is performed to continue to replicate changes asynchronously. If the source server has failed, step S440 is performed. In the absence of a failure, the monitoring and change replication as described above continues. In step S440, the source server fails over to the target, according to a method described below in the discussion of FIGS. 7A, 7B, and 7C.

Figure 6:
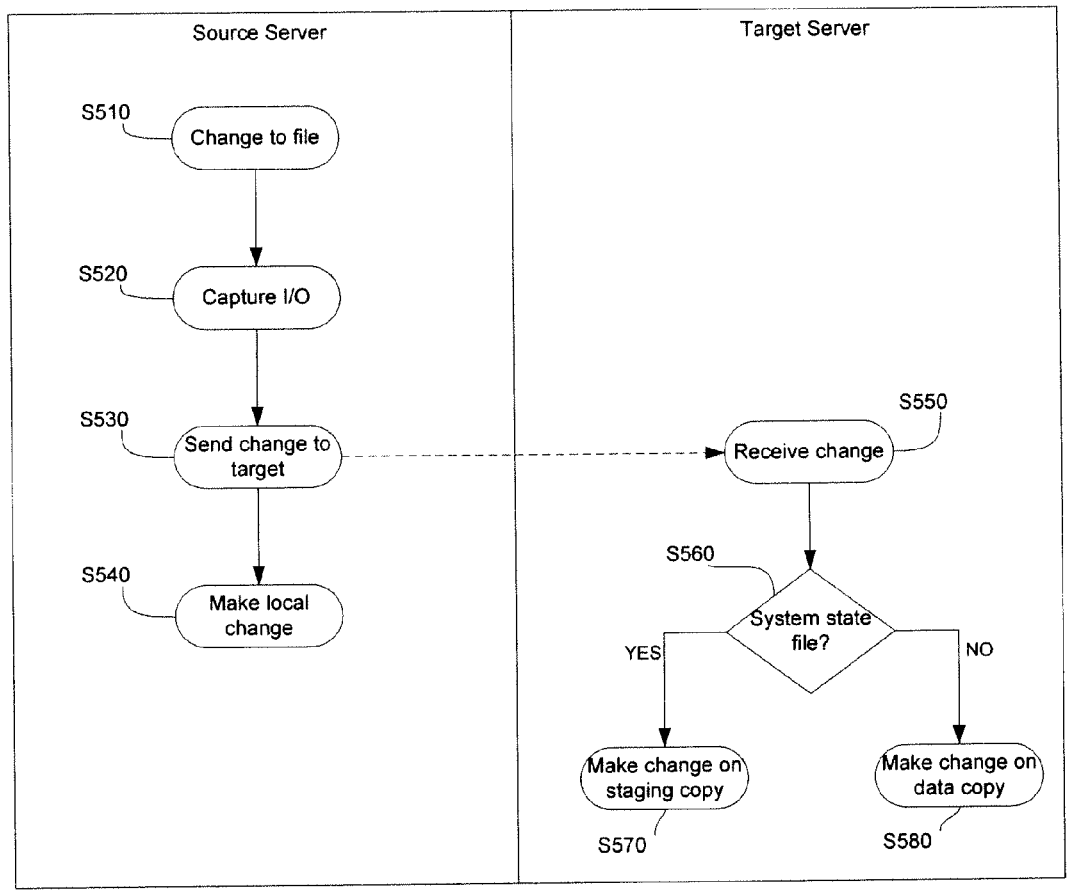
FIG. 6 illustrates a method for replicating file change requests from the source to the target server.

FIG. 6 illustrates a method of replicating files from the source server to the target server. In step S510, a change to a file is requested by an application running on the source server. This change request is captured in step S520 before it is actually written to local disk storage. In step S530, the file change request is sent across the network to the target server. The file change request is normally sent asynchronously, i.e., in substantially real-time. It should be understood that, as explained in U.S. Pat. Nos. 5,974,563 and 5,819,020, file change requests may be bundled together and/or queued up in order to reduce traffic on the network. Further processing, such as compression or encryption, may also be performed on the file change request before it is sent to the target server. In step S540, the file change request is executed on the local disk storage of the source server. As shown in FIG. 6, step S550 is executed on the target server. In step S550, the target server receives the file change request from the source server. In step S560, the target server determines whether the file being changed is a system state file or a data file. In one embodiment, the source server makes this determination based on a known list of system state files and attaches this information to the file change request before sending to the target server. In another embodiment, the target server compares the changed file to a list of known system state files in order to make this determination. If the changed file is a system state file, step S570 is performed. Otherwise, step S580 is performed. In step S570, the change is executed on a corresponding copy of the system state file stored in the staging area. As explained below, during failover this file will be merged into the system state of the target server from the staging area. In step S580, the change is executed on a corresponding copy of the data file, where the data file has the same name and location on the target server as the source server.

Embodiments of the invention may optionally employ dynamic staging to address locked or open files. If step S580 is not successful because a particular file is locked (due to an application or the operating system), the source file may be copied (mirrored) into the staging area and is henceforth treated as a system state file in the sense that all future changes to this file follow step S570.

If the source server 20 fails for any reason, the present invention provides a mechanism to allow the source server 20 to fail over to the target server 30. As explained above, the target server 30 maintains an identical copy of the data files and the system state of the source server 20. The purpose of the failover mechanism is to reconfigure the target server 30 in accord with the replicated system state of the source server 20 so that the target server 30 will, as nearly as possible, be configured identically to the source server 20, providing a transparent failover for the client computers 10. If the failover component 120 running on the target server 30 detects that the source server 20 has failed, the failover procedure, discussed below, is triggered.

Figure 7A:
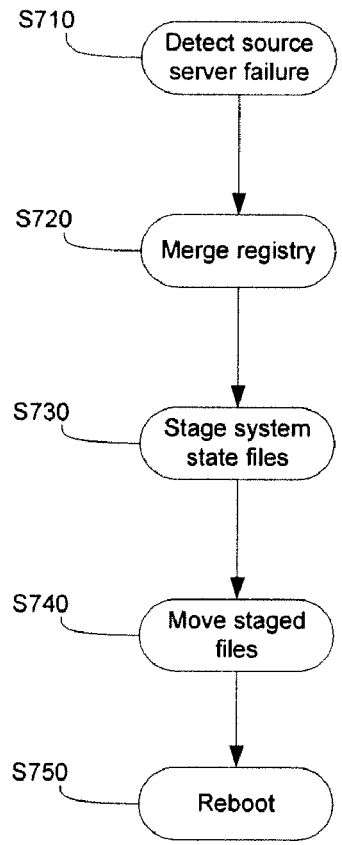
FIGS. 7A, 7B, and 7C illustrate a method of failing over the target server.

FIG. 7A illustrates a method for failing over the system state of the source server to the target server. In step S710, the target server detects the failure of the source server, as explained above. Step S720, explained in more detail in FIG. 7B, encompasses the merging of the replicated registry of the source server with the registry of the target server. The goal of the merge is to use as much of the source server registry as possible. Some local settings may need to be maintained, if the hardware or operating system version of the target server is different from the source server. Some additional considerations may need to be taken into account as well. For example, Network Interface Card (NIC) settings are highly dependent on both the configuration of the source and target NICs, as well as user preferences regarding which target NICs they want each source IP address to run on. Some applications may also require specialized merge settings. For example, if SQL 2000® exists on the source and short file names are used in the registry to denote where certain SQL files are, those short file names must be set to make sure they point to the right location on the target. This is because the long names are unique, and different short names are used on the source and the target.

Continuing with FIG. 7A, once step S720 is complete, the merged registry file will have been saved in the staging area on the target server. In step S730, all of the system state files to be copied, including this merged registry file, are prepared in the staging area. The system state files prepared are identified as those that include the non-conflicting subset of the source server's system state files that will not conflict with the hardware-dependent configuration of the target server. These files to be copied are determined according to an exceptions file combined with dynamic processing of the merged registry to determine which drivers need to be copied. The exceptions file lists system files not to copy over. This list includes dynamic link libraries particular to certain operating system versions as well as other files that should be left unchanged on the target server. For example, this may cover the situation of HAL file processing as described above. Further, drivers are determined by traversing the merged registry to identify which drivers are loaded, as well as any dependencies of those drivers. Thus, both the target and source registries are used to identify which drivers to merge or discard, and if they are retained, how they should be loaded. Thus, the invention is able to retain what system files are needed for the target while trimming off those that are not needed from the source. For step S730, the set of files to be staged optionally may be optimized by comparing each file to the version currently on the target server, and removing a merge file from the set with the same size and date/time stamp as the target server version.

In step S740, the staged files are moved to their correct locations. That is, each file "temporarily" staged in the target's storage area is moved so as to overwrite the corresponding system state file on the target server. For those files that cannot be moved because the original version is locked, appropriate utilities or system calls are utilized depending upon the operating system. For example, the Windows® system call MoveFileEx may used with the MOVEFILE_DELAY_UNTIL_REBOOT flag set. This function call will cause the file to be moved when the system reboots. For more information, see, e.g., http://msdn2.microsoft.com/en-us/library/aa365240.aspx. Thus, in step S750, the system is rebooted so that these file moves are completed. Once the system has rebooted, it will generally be ready to take over the identity of the source server.

In certain utilizations of the present invention, there may be additional processing and/or reboots required. For example, when the target is a domain controller, two reboots may be required. Further, the invention may maintain a list of pending file renames (e.g., a move on reboot list) differently depending upon the operating system. Windows®, for example, has a limitation of how many files can fit into its move on reboot list. If that limit is exceeded during a failover or recovery, a roll over into a secondary list may be employed that the operating system recognizes and treats the same as the primary list. This can extend the size of the list and therefore increase the amount of files can be moved on reboot.

Figure 7B:
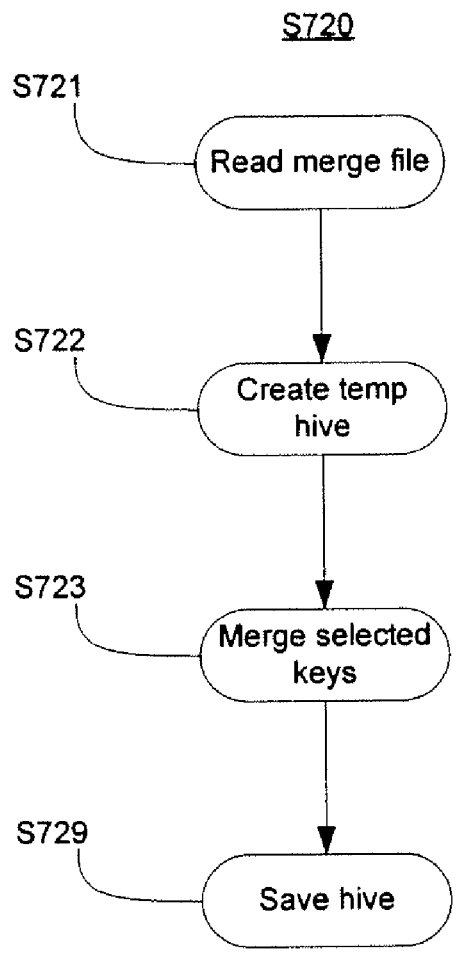

FIG. 7B illustrates a method of merging the registries of the source server and the target server. In step S721, a merge file stored on the target server is read. The general approach is to fail over the source registry content to the target registry as much as possible, except keys or values specified by the merge file. The merge file may be configured manually, such as via a user-friendly client interface adapted to allow for easier manual configuration. In step S722, the invention loads the replicated source server registry into a temporary hive. In step S723, the temporary hive is modified with information from both the merge file and the target server's current registry, as described in more detail below in FIG. 7C. At the end of step S723, the temporary hive contains the result of merging the target server's registry and the source server's registry. In step S724, the temporary hive is saved to the temporary storage area. The temporary hive will replace the target current registry files after reboot as explained above in the description of FIG. 7A.

Figure 7C:
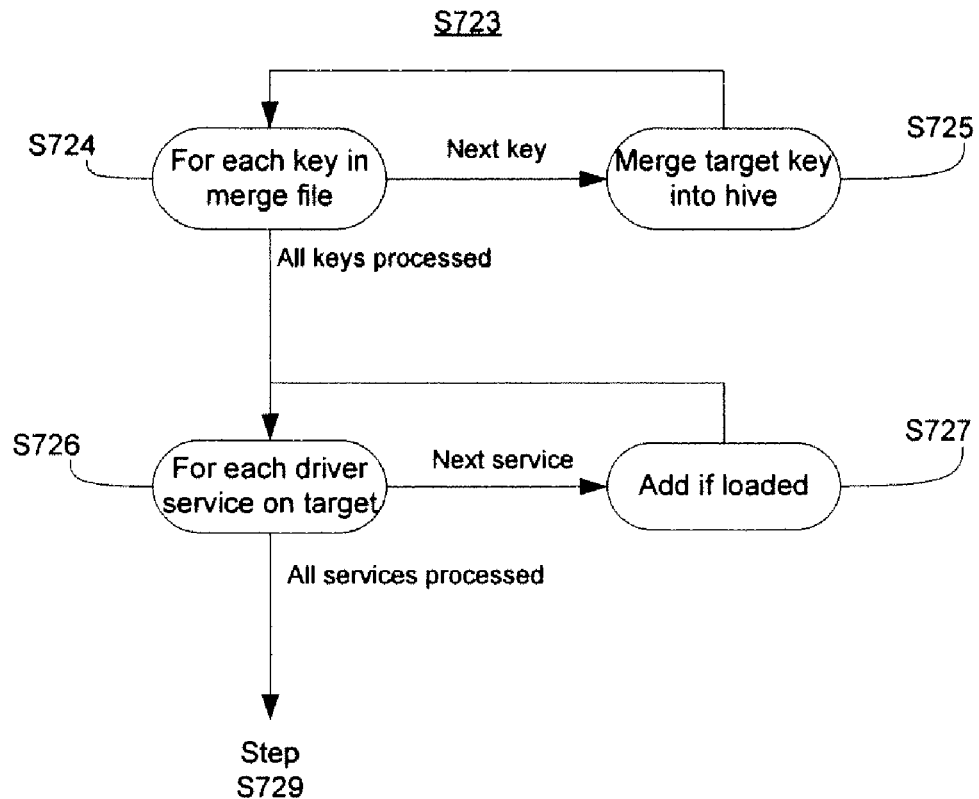

FIG. 7C illustrates a method for merging selected keys from the target server into the saved registry of the source server. As described above, a merge file containing a list of keys to retain from the target server has been read in. Each listed key is marked with one of two options: assign a specified value or use the target server value. Step S724 begins a loop to process the list of keys from the input file. If there is another key to process, step S725 is performed for that key. If all keys have been processed, step S726 is performed. In step S725, the key is merged into the temporary registry described above. If the value of the merging key is specified in the merge file, it takes that value. If the merging key takes its value from the target server registry, that value is used. If the merging key already exists in the temporary registry, the temporary registry version is replaced with the merging key. Otherwise, the merging key is added to the temporary registry. Once step S725 is complete, step S724 is performed again as described above. Unlike other registry settings, driver services (such as mouse or keyboard drivers) are merged dynamically rather than using the merge file. Windows® determines which driver services to load at boot based on certain keys in the registry. Driver services are listed as subkeys of the key HKEY_LOCAL_MACHINE\System\CurrentControlSet\Services.

In step S726, this list of subkeys is processed one at a time. For each driver service, step S727 is performed. If all of the driver services have been processed, step S729 in FIG. 7B is performed. In step S727, if the service is loaded on target server, the subkey for that service is added to the temporary hive. If that driver service already exists in the temporary hive (i.e., it was in the source server's registry), there is a replacement rule. If the driver service was not loaded on the source server, replace the subkey with the version from the target server. If the service is loaded on both servers, the subkey with the higher starting order (i.e., the service that is loaded earlier) is kept.

As mentioned above, if the source server is a domain controller, some additional processing may be required after the initial reboot after the merge described above. If a domain contains multiple active directory servers, an authoritative restore is required. This is because other active directory databases may have a higher sequence number, and thus overwrite the newly restored active directory database which more likely has a lower sequence number, commonly known as a USN rollback scenario. However, embodiments of the invention are preferably adapted to prevent a USN rollback from occurring programmatically during the processing of the registry. To achieve this end, following the merge keys operation and prior to the reboot, a value is inserted within the Directory Services section of the registry that flags this server as having been restored. When rebooted, this flag puts the server into authoritative restore mode, preventing a USN rollback from occurring.

Figure 8:
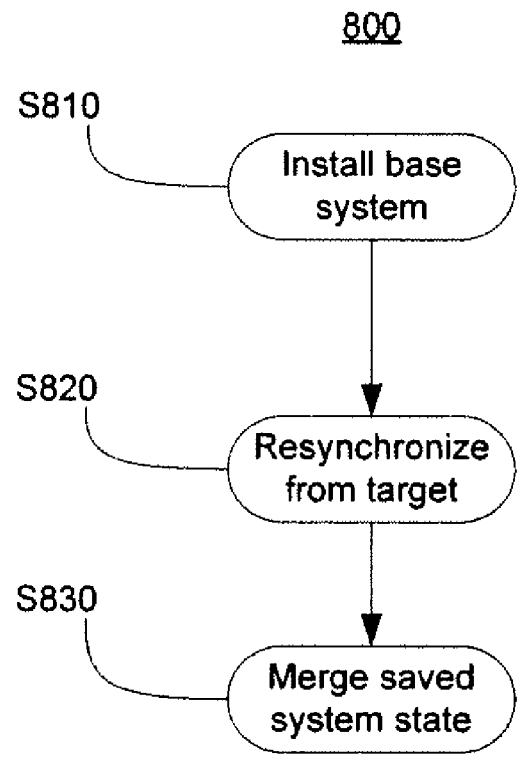
FIG. 8 illustrates a method for automatically rebuilding the source server.

If the source server fails, but can be brought online without reconfiguring, only the data from the target server needs to be resynchronized. Data resynchronization may be performed using the techniques described in U.S. Pat. Nos. 5,974,563 and 5,819,020. If the system state of the source server is lost or corrupted, additional rebuilding is required. FIG. 8 illustrates a method of restoring a source server to its system state before failure. In step S810, a base system is installed on the source server. A base system is the operating system plus components of the present invention. This base system may be installed using any standard technique for loading an image onto local disk storage. In step S820, the source server is resynchronized from the target server. Data is resynchronized as described above, and the same techniques are used to resynchronize the source server's system state files that were replicated to the target server. However, the system state files are copied to a staging area because, as explained above, they cannot simply be copied over the existing system state files. In step S830, the saved system state is merged using the techniques described for FIGS. 7A, 7B and 7C. At the end of the merge, the source server is rebooted. When the source server comes back online, it will have the same configuration that it had before failure. If the rebuilt source server has different hardware than it previously had, the merge will still work, because local hardware settings are retained, as discussed above.

Figure 9A:
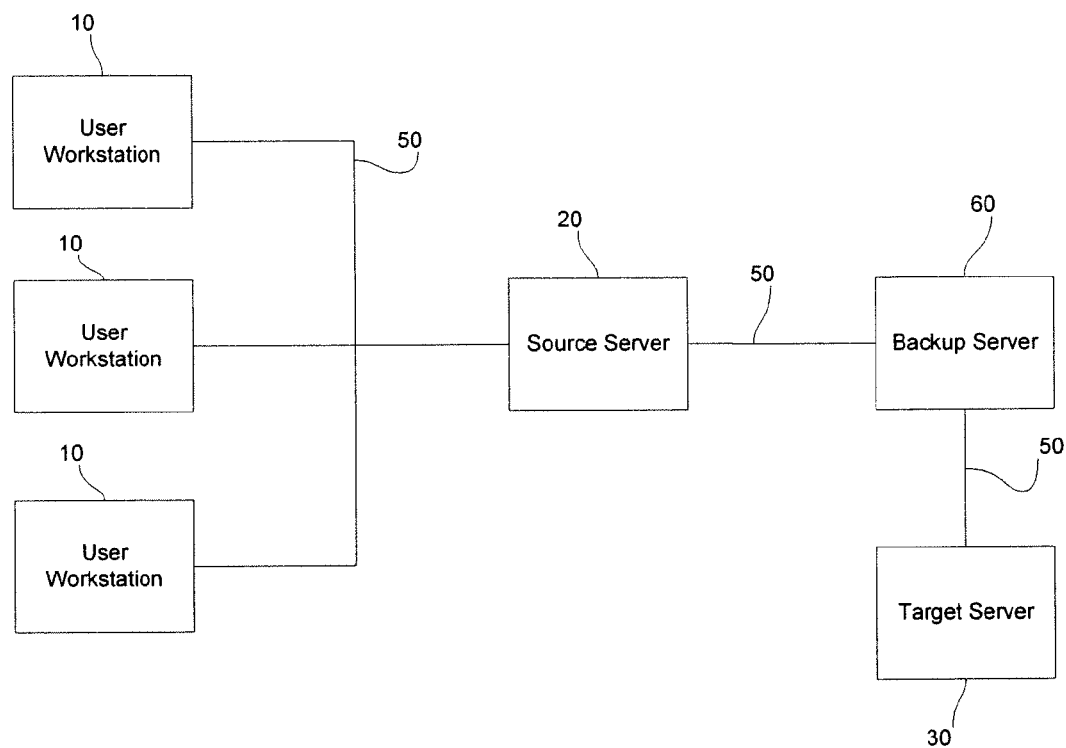
FIGS. 9A and 9B illustrate an overview of an embodiment of the invention wherein the replication and failover functions are performed by separate servers.

FIG. 9A illustrates another embodiment of the invention that includes a separate backup server 60 in addition to the client computers 110, the source server 20 and the target server 30. In this embodiment, asynchronous replication is performed from the source server 20 to the backup server 60. The target server 30 is a separate computer, and may even be a virtual machine. Failing over to a virtual machine is discussed above. The backup server 60 monitors the source server 20. If a failure is detected, an administrator can initiate a recovery of the source server to a specified target server.

In operation, source server 20 replicates file changes on both system state and data files to backup server 60 in real time. The replicated files are stored in an area of backup server 60 designated for backing up source server 20. If failure of source server 20 is detected (whether automatically as described above or via a manual "initiate failover" command from a user), backup server 60 signals target server 30 that it will be taking over for source server 20. Backup server 60 then pushes the replicated data and system state files out to target server 30. Target server 30 then merges the source server 20's system state files (as described above for FIG. 7A) and takes over the identity of source server 20. When source server 20 comes back up, backup server 60 will inform it that it needs to resynchronize with target server 30.

Figure 9B:
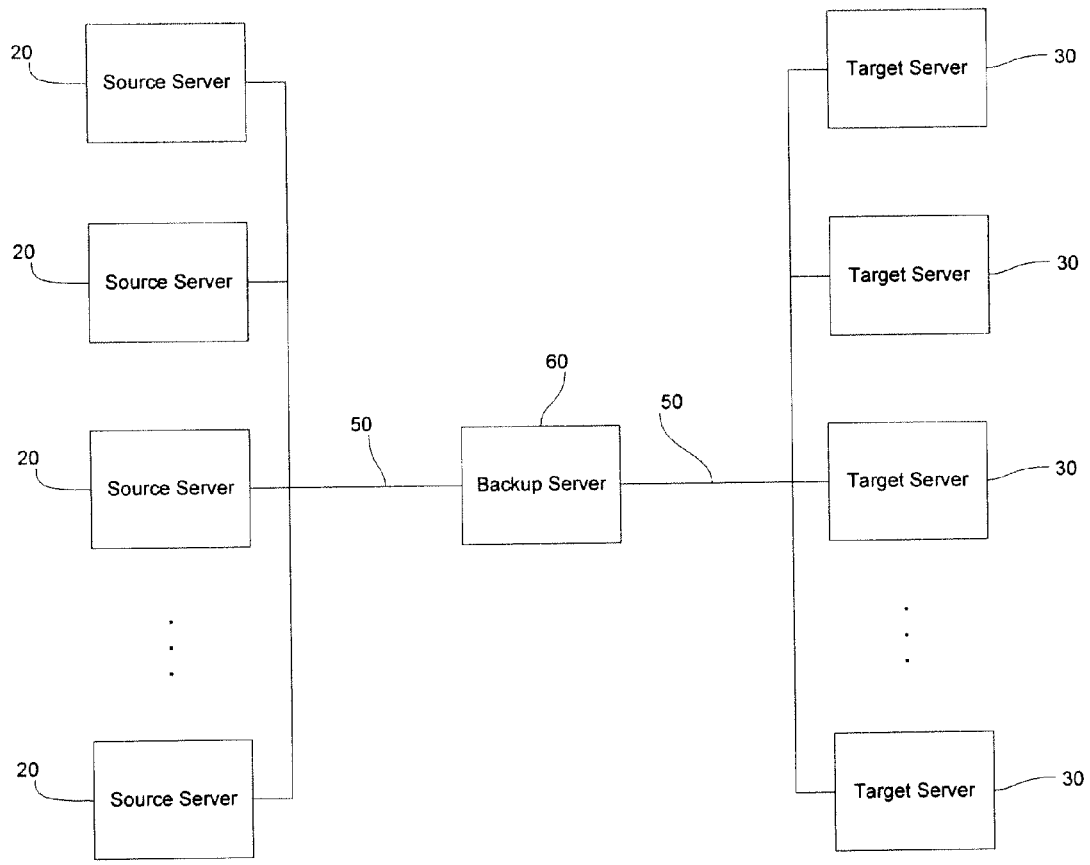

FIG. 9B illustrates a variation of the embodiment illustrated in FIG. 9A. The system shown in FIG. 9B has a plurality of source servers and a plurality of target servers 30 connected to the backup server 60. In this embodiment, if a source server 20 fails, the backup server 60 may fail that source server 20 over to any one of the connected target servers 30. The backup server 60 stores a list of available target servers 30, and selects one target server 30 from the list, either automatically or manually. The method of failover is the same method described above for FIG. 9A. This embodiment also allows server provisioning, i.e., using a single server image to create a set of servers with identical configurations but different identities, with capabilities to allow the user to change server names, IP addresses, GUIDs, and the like for each server being provisioned.

Various embodiments of the invention may optionally utilize an image snapshot approach to allow users to select from a plurality of different backup snapshots (e.g., corresponding to different backup times) whenever a failover or recovery is triggered. In this regard, a user may be permitted to establish a schedule according to which a suitable image snapshot application takes snapshots of the entire source server image at a certain interval. For example, snapshots can be taken using the Microsoft Volume Shadow Service (VSS)™, which is available on Windows 2003 and later, or similar image snapshot applications or engines. The image snapshot application is called the user-specified intervals or times and is to take a snapshot of the target files, including replicated files and staged files. At the time of failover or recovery, the user is thereby provided with a list of all the snapshots that have been taken (e.g., with a timestamp, date, or other identifier identifying the different snapshots). The user thus can choose to either recover/failover to the "live image" (i.e. the current files on the target system), or any number of prior versions of the files from a specific snapshot. If the user selects a prior snapshot, the image snapshot application can be used to "revert" the target server to that point in time with the appropriate system state applied according to a smart merge as described herein. As a result, the now-recovered target system looks like the original system did at the particular point in time of the chosen snapshot.

To revert files on a system volume, a mounting of the snapshot is performed to expose the data from that point in time on a mount point on the target server. In particular, a directory to which to "mount" the snapshot may be specified through which read-only copies of the prior-version data files from the selected snapshot image are made available. The target server then mirrors those prior version data files over the current live versions of the files. Mirroring of the staged files to the staging directory in this manner avoids overwriting the live files on the target. Further, "live" system state files would typically be excluded from this mirror, since they can't be overwritten directly on the target server and they would be replaced via the system state merge process as described herein. Once this mirroring process is done, the system state may then be applied as otherwise described herein.

Figure 10:
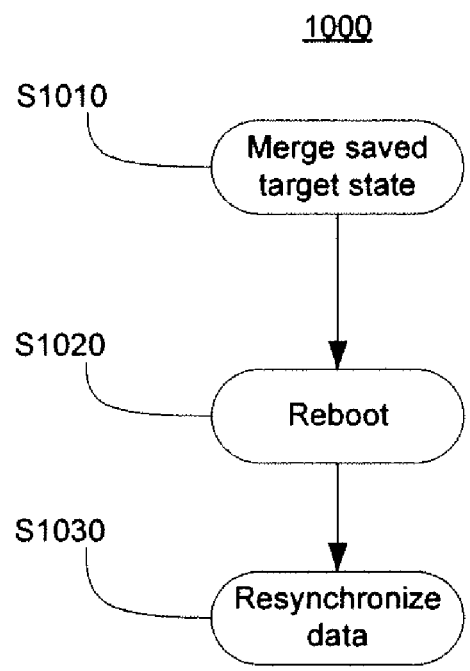
FIG. 10 illustrates a method for reversing the roles of the source and target servers after failover.

FIG. 10 illustrates a method of reversing the roles of the source and target servers after failover and recovery. Rather than bringing the source back up and restoring it to its original role as source server, it may be more efficient to have the source change roles, and act as the target server, leaving the failed over target server to act as source. For example, if both machines are quite similar or even identical in terms of hardware and operating system, there may be no advantage to one or the other machine acting as target server. In such a situation, it is easier and results in less down time to leave the failed over target server as the new source, and fail over the original source to become the new target server. This method may be used once the target server has successfully failed over to take on the role of the source server. As explained above in the discussion of FIG. 4C, the source server normally maintains a copy of the system state of the target server. In step S1010, the source server merges that saved system state using the same method that the target server used to merge when it failed over, discussed above for FIGS. 7A, 7B, and 7C. In step S1020, as required after the merge, the original source server reboots. Once the reboot is complete, the original source server has taken on the identity and the role of the original target server. In step S1030, the new target server (i.e., the original source server) resynchronizes its data with the new source server (i.e., the original target server) so that both servers once again have identical copies of the same data.

Figure 11:
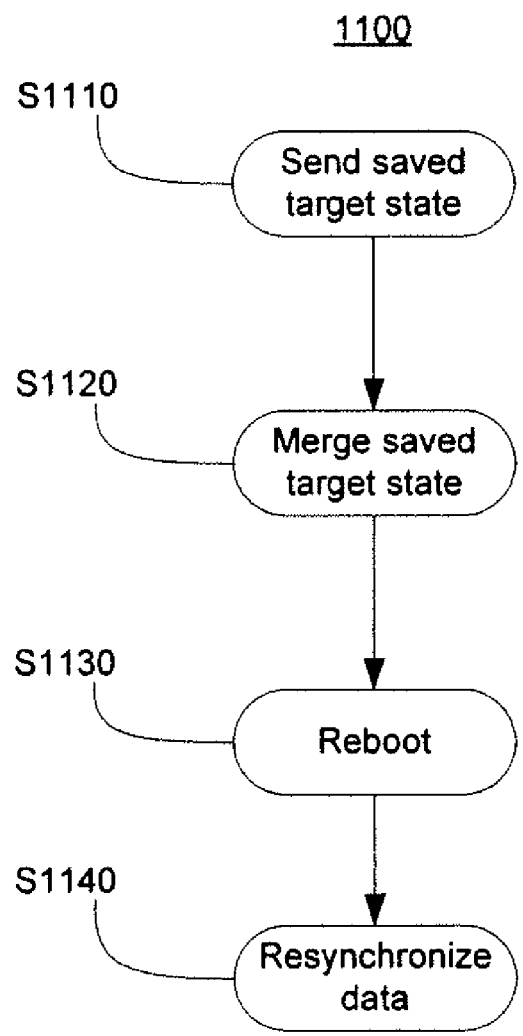
FIG. 11 illustrates a method for rescuing the target server after failure.

FIG. 11 illustrates a method of rescuing the target server in the event that the target server fails. Because the target server system state is stored on the source, as explained above in the discussion of FIG. 4C, it is possible to rescue the target server if it goes down, instead of having to rebuild it. In step 1110, the source server sends the saved system state of the target server to the target. The target server places this system state in a staging area, because system state files cannot be overwritten directly. In step 1120, the target server performs a merge, merging its saved state using the method of merging discussed above for FIGS. 7A, 7B, and 7C. In step 1130, the target server reboots. When the reboot is complete, the target server is configured to its system state prior to failure. In step 1140, the target server resynchronizes with the source server so that both servers once again have identical copies of the same data.

We claim:

1. A method for backing up a first server, comprising the steps of:
    providing a disk storage connected to a second server, said disk storage comprising a staging area;
    replicating changes to data files and system state files of the first server to the staging area connected to the second server; wherein the replicated changes to the files of the first server are made to a corresponding copy of the files stored in the staging area of the second server; wherein the staging area of the second server stores replicated versions of files that are locked to avoid overwriting of live files on the second server; and
    upon detection of a failure of the first server, failing over the first server to the second server by merging the replicated system state files of the first server into a system state of the second server.

2. The method of claim 1, further comprising an initial step of copying the data files and system state files of the first server to the second server.

3. The method of claim 1, where the step of replicating changes is performed asynchronously.

4. The method of claim 1, where the step of merging the replicated system state files from the first server into a system state of the second server further comprises the steps of:
  merging a registry of the second server with a registry of the first server and saving the merged registry to a file in a temporary storage area on the second server;
  copying a non-conflicting subset of the replicated system state files of the first server to the temporary storage area, where the non-conflicting subset is constructed so as to retain hardware-dependent configuration of the second server; and
  moving the system state files from the temporary storage area so as to overwrite corresponding system state files on the second server.

5. The method of claim 4, where the step of merging the replicated system state files from the first server into a system state of the second server further comprises the final step of rebooting the second server.

6. The method of claim 1, further comprising, after failover and restart of the first server, resynchronizing the data files of the second server to the first server.

7. The method of claim 6, further comprising the steps of:
  after resynchronizing the data files of the second server to the first server, copying the system state files from the staging area on the second server to the first server; and
  merging the copied system state files into a system state of the first server.

8. The method of claim 1, further comprising the step of replicating file changes to system state files of the second server to the first server, where replicated file changes are made to a corresponding copy of the file on the first server, copies of the system state files being located in a staging area on local storage of the first server.

9. The method of claim 8, further comprising, after failover and restart of the first server, merging the replicated system state files of the second server into a system state of the first server.

10. The method of claim 8, further comprising the steps of:
  detecting a failure of the second server;
  after restart of the second server, copying the system state files from the staging area of the first server to the second server; and
  merging the copied system state files into a system state of the second server.

11. The method of claim 1, where the first server includes a plurality of source servers.

12. The method of claim 1, where the second server includes a plurality of target servers.

13. The method of claim 1, further comprising capturing image snapshots of the files on the first server at a plurality of times, and, upon detection of a failure at the first server, giving a user an option to restore the second server to any one of said captured image snapshots.

14. The method of claim 1, wherein the step of replicating changes to data files and system state files of the first server to the second server additionally comprises intercepting file change requests at an input output level and mirroring those file change requests to the second server so that system state files from the first server are replicated in near real-time onto the second server.

15. The method of claim 1, comprising the steps of directing the second server to rescue the first server by restoring the first server's file integrity by rebuilding the first server's data and system files by transferring the data and system files from the second server back to the first server.

16. The method of claim 1, comprising the steps of directing the second server to reverse roles with the first server by: directing the second server to assume the role of the first server, transferring system and state files which relate to the second server's role as the second server to the first server so that the first server can assume the role of the second server.

17. A method for backing up a first server comprising the steps of:
  providing a disk storage connected to a second server, said disk storage comprising a staging area;
  replicating changes to data files and system state files of the first server to the staging area connected to the second server; wherein the replicated changes to the files of the first server are made to a corresponding copy of the files stored in the staging area of the second server; wherein the staging area of the second server stores replicated versions of files that are locked to avoid overwriting of live files on the second server;
  upon detection of the failure of the first server, failing over the first server to a third server by the steps of:
    copying the replicated data files of the first server from the second server to the third server;
    copying the replicated system state files of the first server from the second server to the third server, where the replicated system state files of the first server are copied to a staging area on the third server; and
    merging the copied system state files into a system state of the third server.

18. The method of claim 17, where the step of replicating changes is performed asynchronously.

19. The method of claim 17, where the step of failing over the first server to a third server further comprises selecting the third server from a list of servers, where the list is stored on the second server.

20. The method of claim 17, where the method of failing over the first server to a third server further comprises, prior to copying the replicated system state files of the first server from the second server to the third server, validating the system state of the third server for compatibility with a system state of the first server.

21. The method of claim 17, further comprising an initial step of copying the data files and system state files of the first server to the second server.

22. The method of claim 17, further comprising, after failover and restart of the first server, resynchronizing the data files of the third server to the first server.

23. The method of claim 22, further comprising the steps of:
  after resynchronizing the data files of the third server to the first server, copying the system state files from the staging area on the second server to the first server; and
  merging the copied system state files into a system state of the first server.

24. The method of claim 22, further comprising the steps of:
  after resynchronizing the data files of the third server to the first server, copying the system state files from the staging area on the third server to the first server; and
  merging the copied system state files into a system state of the first server.

25. The method of claim 17, further comprising capturing image snapshots of the files on the first server at a plurality of times, and, upon detection of a failure at the first server, giving a user an option to restore the data files of said third server to reflect any one of said captured image snapshots.

26. A system for backup of a source server, comprising:
the source server, further including local storage and a connection to a network;
a target server, including local storage and a connection to the network;
a disk storage connected to the target server, said disk storage comprising a staging area;
a replication component executing on the source and target servers, where the replication component replicates changes to data files and system state files of the source server to the staging area connected to the target server; wherein the replicated changes to the files of the source server are made to a corresponding copy of the files stored in the staging area of the target server; wherein the staging area of the target server stores replicated versions of files that are locked to avoid overwriting of live files on the target server;
a failover component executing on the source and target servers, where the failover component on the target server:
detects a failure of the source server, and
upon detection of the failure of the source server, fails over the source server to the target server by merging the replicated system state files of the source server into a system state of the target server.

27. The system of claim 26, wherein the replication component performs an initial step of copying the data files and system state files of the source server to the target server.

28. The system of claim 26, wherein the replication component replicates changes asynchronously.

29. The system of claim 26, wherein replicated changes to a file of the source server are made to a corresponding copy of the file on the target server, copies of the system state files being located in a staging area on the local storage of the target server.

30. The system of claim 26, wherein the step of merging the replicated system state files from the source server into a system state of the target server further comprises the steps of:
merging a registry of the target server with a registry of the source server and saving the merged registry to a file in a temporary storage area on the target server;
copying a non-conflicting subset of the replicated system state files of the source server to the temporary storage area, where the non-conflicting subset is constructed so as to retain hardware-dependent configuration of the target server; and
moving the files from the temporary storage area so as to overwrite corresponding system state files on the target server.

31. The system of claim 30, wherein the step of merging the replicated system state files from the source server into a system state of the target server further comprises the final step of rebooting the second server.

32. The system of claim 29, wherein the failover component further performs the step of, after failover and restart of the source server, resynchronizing the data files of the target server to the source server.

33. The system of claim 32, wherein the failover component further performs the steps of:
after resynchronizing the data files of the target server to the source server, copying the system state files from the staging area on the target server to the source server; and
merging the copied system state files into a system state of the source server.

34. The system of claim 26, wherein the replication component further performs the step of replicating file changes to system state files of the target server to the source server, where replicated file changes are made to a corresponding copy of the file on the source server, copies of the system state files being located in a staging area on the local storage of the target server.

35. The system of claim 34, wherein the failover component further performs the step of, after failover and restart of the source server, merging the replicated system state files of the target server into a system state of the source server.

36. The system of claim 34, wherein the failover component further performs the steps of:
detecting a failure of the target server;
after restart of the target server, copying the system state files from the staging area of the source server to the target server; and
merging the copied system state files into a system state of the target server.

37. The system of claim 26, wherein image snapshots of the files on the source server are captured by an image snapshot application operated by said image replication component, and wherein said failover component is configured to, upon detection of a failure at the source server, give a user an option to restore the target server to reflect any one of said captured image snapshots.

38. The system of claim 26, wherein the replication component intercepts file change requests at an input output level and mirrors those file change requests to the target server so that system state files from the source server are replicated in near real-time onto the target server.

39. The system of claim 29, wherein the staging area of the target server stores replicated versions of files that are locked or open on the target server to avoid overwriting of live files on the target server.

40. The system of claim 26, wherein the failover component of the target server rescues the source server by restoring the source server's file integrity by rebuilding the source server's data and system files by transferring the data and system files from the target server back to the source server.

41. The system of claim 26, wherein the failover component of the target server causes the target server to reverses roles with the source server by directing the target server to assume the role of the source server, and transferring system and state files which relate to the target server's role as the target server to the source server so that the source server can assume the role of the target server.

42. A system for backing up a source server comprising:
the source server, further including local storage and a connection to a network;
a backup server, including local storage and a connection to the network;
at least one target server, including local storage and a connection to the network;
a disk storage connected to a target server, said disk storage comprising a staging area;
a replication component executing on the source and backup servers, where the replication component replicates changes to data files and system state files of the source server to the staging area connected to the target server; wherein the replicated changes to the files of the source server are made to a corresponding copy of the files stored in the staging area of the target server; wherein the staging area of the target server stores replicated versions of files that are locked to avoid overwriting of live files on the target server;
a failover component executing on the source, backup, and target servers, where the failover component on the backup server:

detects a failure of the source server, and
upon detection of the failure of the source server, fails over the source server to a selected target server from the at least one target servers by the steps of:
copying the replicated data files of the source server from the backup server to the selected target server;
copying the replicated system state files of the source server from the backup server to the selected target server, where the replicated system state files of the source server are copied to a staging area on the selected target server; and
merging the copied system state files into a system state of the selected target server.

43. The system of claim 42, wherein the replication component replicates changes asynchronously.

44. The system of claim 42, wherein the backup server selects the selected target server from a list of servers, where the list is stored on the backup server.

45. The system of claim 42, wherein the failover component further performs the step of, prior to copying the replicated system state files of the source server from the backup server to the selected target server, validating the system state of the selected target server for compatibility with a system state of the source server.

46. The system of claim 42, wherein the replication component further performs an initial step of copying the data files and system state files of the source server to the backup server.

47. The system of claim 42, wherein the failover component further performs the step of, after failover and restart of the source server, resynchronizing the data files of the selected target server to the source server.

48. The system of claim 47, wherein the failover component further performs the steps of:
after resynchronizing the data files of the selected target server to the source server, copying the system state files from the staging area on the backup server to the source server; and
merging the copied system state files into a system state of the source server.

49. The system of claim 47, wherein the failover component further performs the steps of:
after resynchronizing the data files of the selected target server to the source server, copying the system state files from the staging area on the selected target server to the source server; and
merging the copied system state files into a system state of the source server.

50. A computer-readable medium encoding a program for backing up a first server, where the program comprises a set of instructions for performing the steps of:
replicating changes to data files and system state files of the first server to a staging area stored in a disk storage connected to a second server; wherein the replicated changes to the files of the first server are made to a corresponding copy of the files stored in the staging area of the second server; wherein the staging area of the second server stores replicated versions of files that are locked to avoid overwriting of live files on the second server;
detecting a failure of the first server; and
upon detection of the failure of the first server, failing over the first server to the second server by merging the replicated system state files of the first server into a system state of the second server.

51. The computer-readable medium of claim 50, wherein the program further comprises instructions for performing an initial step of copying the data files and system state files of the first server to the second server.

52. The computer-readable medium of claim 50, wherein the step of replicating changes is performed asynchronously.

53. The computer-readable medium of claim 50, wherein the step of merging the copied system state files from the first server into the system state of the second server further comprises the steps of:
merging a registry of the second server with a registry of the first server and saving the merged registry to a file in a temporary storage area on the second server;
copying a non-conflicting subset of the replicated system state files of the first server to the temporary storage area, where the non-conflicting subset is constructed so as to retain hardware-dependent configuration of the second server; and
moving the system state files from the temporary storage area so as to overwrite corresponding system state files on the second server.

54. The computer-readable medium of claim 53, wherein the step of merging the copied system state files from the first server into the system state of the second server further comprises the final step of rebooting the second server.

55. The computer-readable medium of claim 50, wherein the program further comprises instructions for performing the step of, after failover and restart of the first server, resynchronizing the data files of the second server to the first server.

56. The computer-readable medium of claim 55, wherein the program further comprises instructions for performing the steps of:
after resynchronizing the data files of the second server to the first server, copying the system state files from the staging area on the second server to the first server; and
merging the copied system state files into a system state of the first server.

57. The computer-readable medium of claim 50, wherein the program further comprises instructions for performing the step of replicating file changes to system state files of the second server to the first server, where replicated file changes are made to a corresponding copy of the file on the first server, copies of the system state files being located in a staging area on local storage of the first server.

58. The computer-readable medium of claim 57, wherein the program further comprises instructions for performing the step of, after failover and restart of the first server, merging the replicated system state files of the second server into a system state of the first server.

59. The computer-readable medium of claim 57, wherein the program further comprises instructions for performing the steps of:
detecting a failure of the second server;
after restart of the second server, copying the system state files from the staging area of the first server to the second server; and
merging the copied system state files into a system state of the second server.

60. The computer-readable medium of claim 50, wherein the first server is a plurality of source servers.

61. The computer-readable medium of claim 50, wherein the second server is a plurality of target servers.

62. A computer-readable medium encoding a program for backing up a first server, where the program comprises a set of instructions for performing the steps of:
replicating changes to data files and system state files of the first server to replicating changes to data files and system state files of the first server to a staging area stored in a disk storage connected to a second server; wherein the replicated changes to the files of the first server are made to a corresponding copy of the files stored in the staging area of the second server; wherein the staging area of the second server stores replicated versions of files that are locked to avoid overwriting of live files on the second server;

detecting a failure of the first server; and upon detection of the failure of the first server, failing over the first server to the third server by the steps of:

copying the replicated data files of the first server from the second server to the third server;

copying the replicated system state files of the first server from the second server to the third server, where the replicated system state files of the first server are copied to a staging area on the third server; and merging the copied system state files into a system state of the third server.

63. The computer-readable medium of claim 62, wherein the step of replicating changes is performed asynchronously.

64. The computer-readable medium of claim 62, wherein the step of failing over the first server to a third server further comprises selecting the third server from a list of servers, where the list is stored on the second server.

65. The computer-readable medium of claim 62, wherein the method of failing over the first server to a third server further comprises, prior to copying the replicated system state files of the first server from the second server to the third server, validating the system state of the third server for compatibility with a system state of the first server.

66. The computer-readable medium of claim 62, wherein the program further comprises instructions for performing an initial step of copying the data files and system state files of the first server to the second server.

67. The computer-readable medium of claim 62, wherein the program further comprises instructions for performing the step of, after failover and restart of the first server, resynchronizing the data files of the third server to the first server.

68. The computer-readable medium of claim 67, wherein the program further comprises instructions for performing the steps of:

after resynchronizing the data files of the third server to the first server, copying the system state files from the staging area on the second server to the first server; and merging the copied system state files into a system state of the first server.

69. The computer-readable medium of claim 67, wherein the program further comprises instructions for performing the steps of:

after resynchronizing the data files of the third server to the first server, copying the system state files from the staging area on the third server to the first server; and merging the copied system state files into a system state of the first server.

* * * * *